United States Patent [19]

O'Brian et al.

[11] 4,109,427
[45] Aug. 29, 1978

[54] FOLDABLE STRUCTURES CONSIDERED TO BE PRIMARILY USEFUL AS DOGHOUSES

[76] Inventors: Edward D. O'Brian, 910 Iroquois St., Anaheim, Calif. 92801; William M. Plachy, 3533 Encinitas Rd., San Marcos, Calif. 92069

[21] Appl. No.: 752,104

[22] Filed: Dec. 20, 1976

[51] Int. Cl.² ................. E04D 1/36; E04B 1/344; A01K 1/02
[52] U.S. Cl. ................. 52/58 R; 52/70; 52/71; 119/19
[58] Field of Search ............. 211/195; 119/19; 52/58, 52/69, 70

[56] References Cited

U.S. PATENT DOCUMENTS

| 456,307 | 7/1891 | Hodsdon | 52/70 |
| 2,445,055 | 7/1948 | Capaul | 119/19 X |
| 3,043,264 | 7/1962 | Felhofer et al. | 119/19 |

*Primary Examiner*—Hugh R. Chamblee

*Attorney, Agent, or Firm*—Edward D. O'Brian

[57] ABSTRACT

A structure such as a doghouse can be constructed so as to be capable of being folded between an expanded configuration in which parallel side walls are connected by a top, a bottom, and parallel ends and a folded configuration in which the side walls are adjacent to one another. In order to achieve a folding action the top, the bottom and the ends each consists of a set of two parts. The parts of each of these sets extend between the side walls. A first group of hinges are used to pivotally connect the parts of each of the sets to the side walls. A second group of hinges are employed to connect the parts of each set midway between the side walls. All of the hinges of both groups which are secured to the top and the bottom have parallel axes and all of the hinges of both groups secured to the ends have parallel axes. Further, all of the axes of the hinges of the second group are located in a common plane midway between the side walls. In the disclosed preferred structure doors which close through the action of gravity are located on the parts of one of the ends.

9 Claims, 7 Drawing Figures

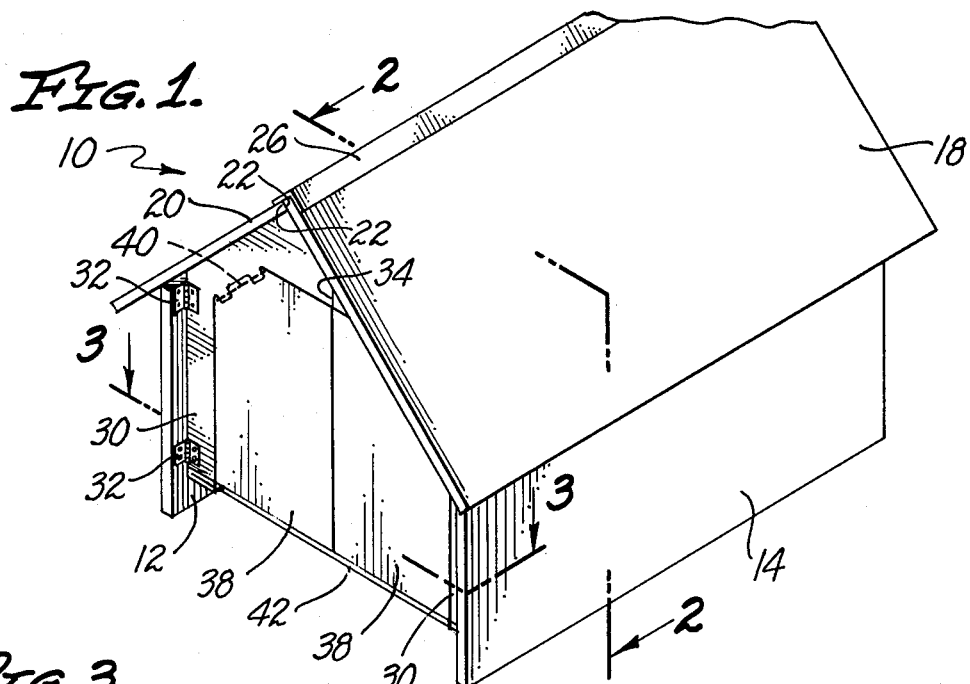
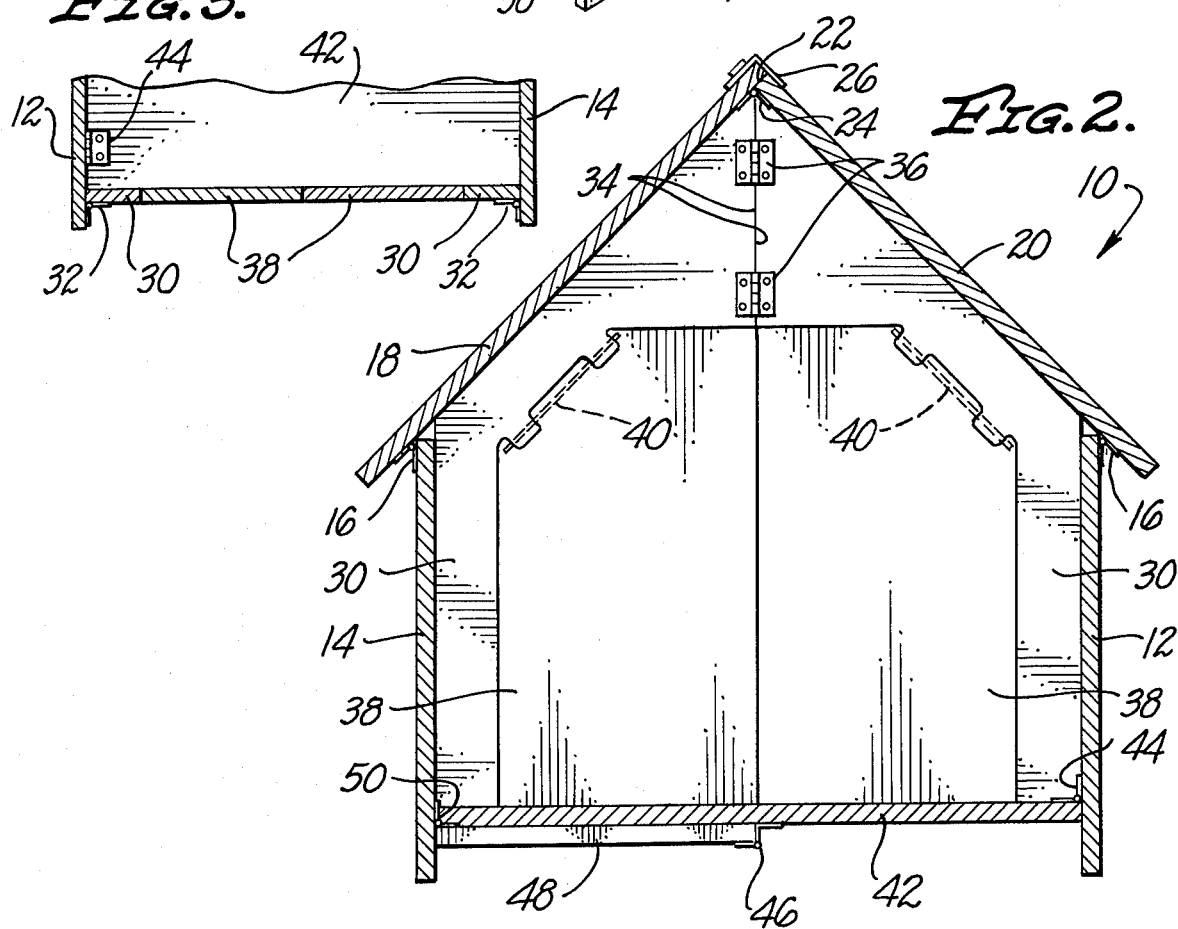

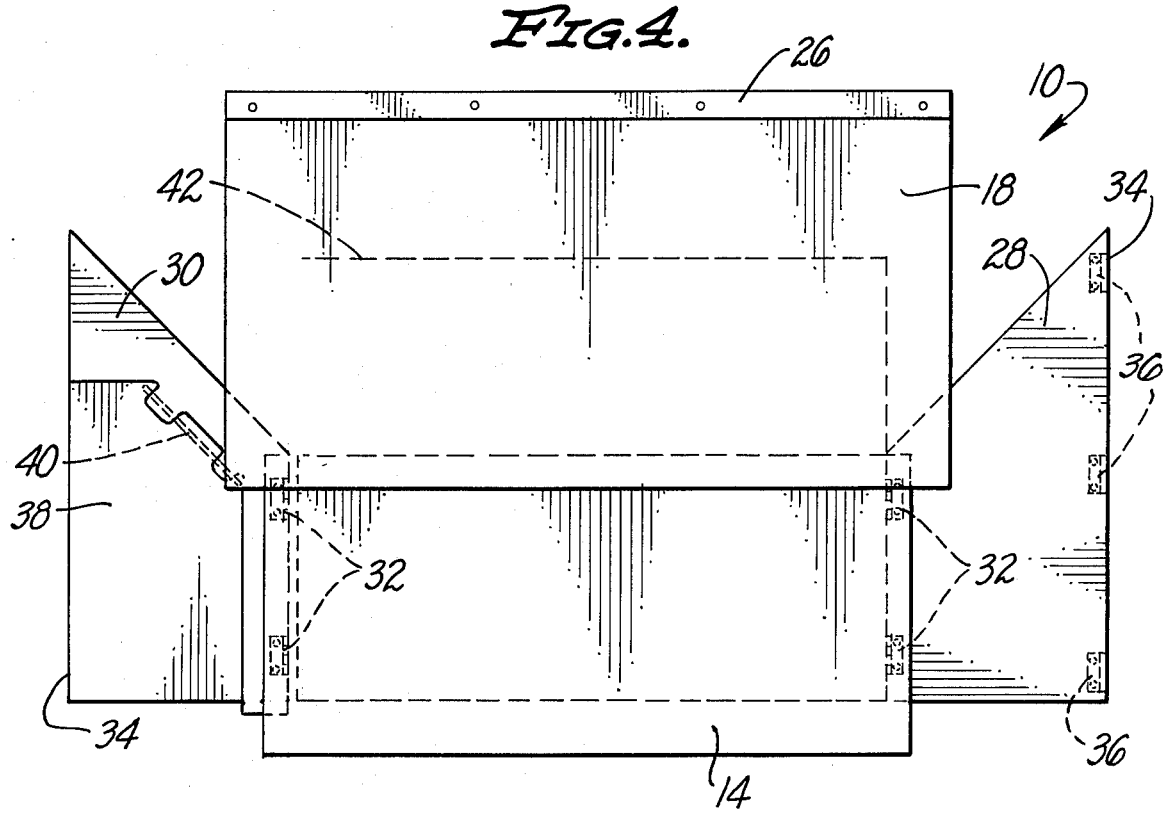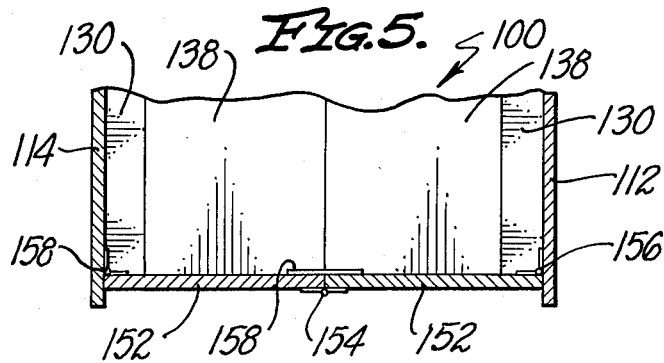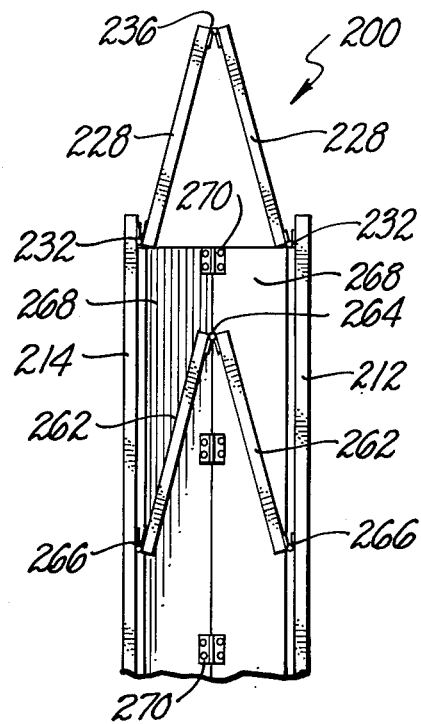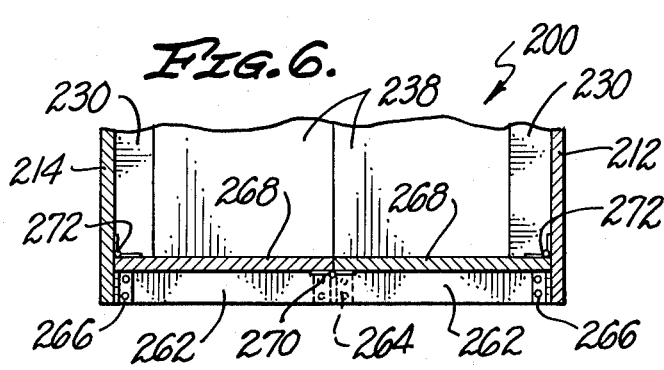

FOLDABLE STRUCTURES CONSIDERED TO BE PRIMARILY USEFUL AS DOGHOUSES

BACKGROUND OF THE INVENTION

The invention set forth in this specification pertains to completely assembled foldable structures which are capable of being folded between an expanded configuration in which these structures may be utilized for an intended purpose and a folded configuration in which these structures may be conveniently stored, handled and/or moved.

The foldable structures of the present invention are considered to be primarily useful as doghouses. It will, of course, be recognized that doghouses are essentially hollow structures intended to provide a degree of shelter against ambient influences to dogs and other animals such as are commonly utilized as pets. Although it is considered that the present invention has its primary utility in the field of doghouses it is also considered that foldable structures falling within the scope of this invention can be utilized for many purposes. Thus, it is considered that such structures may have utility as playhouses, storage sheds and the like.

It is considered that most existing doghouse structures are reasonably adapted to their utilization. However, such existing structures tend to be undesirable because of a problem connected with the handling of such doghouses. Because they are comparatively bulky, hollow structures it is somewhat difficult to package them for shipping. Further, because they are such bulky structures they occupy a great deal of warehouse space and space in the merchandising establishment. As a consequence of these factors it is considered that conventional doghouses are relatively undesirable products for merchandising organizations to deal in and handle.

Many firms have attempted to facilitate the shipment, handling and storage of doghouses to be sold by packaging doghouses in a so-called "knocked down" form. Such knocked down doghouses are preassembled by a manufacturer to a limited extent or degree normally intended to be sufficient so that ultimate purchasers can assemble them with a minimum amount of difficulty. The sale of knocked down doghouses is somewhat advantageous in that it may lower the cost of the doghouse to the ultimate consumer by eliminating the cost to a manufacturer of completely assembling such a product.

However, the sale of doghouses in a knocked down form is also disadvantageous inasmuch as a consumer may lack the skills or tools necessary to assemble a completed doghouse and/or may find the various parts of such a doghouse do not seem to go together properly in accordance with assembly instructions normally provided by a manufacturer. Such customer or user problems are disadvantageous inasmuch as they may lead to complaints and/or returned merchandise.

SUMMARY OF THE INVENTION

An object of the present invention is to provide new and improved doghouses. More specifically an object of the present invention is to provide doghouses which are of such a character that they may be shipped and handled in a folded configuration in which they occupy a comparatively small amount of space and which may be manipulated with a minimum of difficulty from such a folded configuration to an expanded, normal configuration for display purposes or for use by a dog or other pet. A related objective of the present invention is to provide foldable structures having side walls, a top or roof, a bottom and end walls all connected to the side walls which can be utilized for other purposes such as for play purposes and which are advantageous for substantially the same reasons that the foldable doghouses of the invention are advantageous.

In accordance with this invention these various objectives are achieved by providing a structure having spaced, parallel side walls, a top, a bottom, and parallel ends enclosing the space between the side walls in which the improvement comprises: said top, said bottom, and said ends each including a set of two parts, the parts of these sets being located adjacent to one another so that each set extends between the side walls, a first group of hinge means, each hinge means of the first group pivotally connecting a single part of each of said sets to said side wall, a second group of hinge means, each hinge means of said second group pivotally connecting the parts of each set midway between said side walls, all of said hinge means of both groups which are secured to said top and said bottom having parallel axes, all of the hinge means of both groups which are secured to said ends having parallel axes, said hinge means in said first and second groups permitting said structure to be folded between an expanded configuration in which said side walls are spaced from one another and a folded configuration in which said side walls are adjacent to one another.

With a structure of the present invention the various hinge means noted in the preceding summary act as pivots enabling the type of folding action desired to be achieved. This type of folding action is based upon a well known Sarrus linkage. In effect the structures of the present invention are based upon such a six-member linkage and extend the utilization of such a linkage so as to obtain the utilitarian result of a foldable structure which in its expanded configuration is an enclosed structure having a utilitarian character.

BRIEF DESCRIPTION OF THE DRAWING

The invention is best more fully explained with reference to the accompanying drawing in which:

FIG. 1 is an isometric view of a presently preferred embodiment or form of a foldable structure — more specifically a doghouse — in accordance with this invention;

FIG. 2 is a cross-sectional view taken at line 2—2 of FIG. 1;

FIG. 3 is a partial cross-sectional view taken at line 3—3 of FIG. 1;

FIG. 4 is a side elevational view of the structure shown in FIG. 1 in a folded configuration;

FIG. 5 is a partial cross-sectional view corresponding to the bottom part of FIG. 2 of a slightly modified foldable structure in accordance with this invention;

FIG. 6 is a view corresponding to FIG. 5 of a further modified foldable structure in accordance with this invention; and FIG. 7 is a bottom plan view showing a part of the bottom of the structure shown in FIG. 6 when this structure is in a folded configuration.

From a detailed consideration of this specification and the drawing it will be realized that the various structures illustrated utilize certain operative concepts or principles as are set forth and defined in the appended claims. It is considered that these same concepts and principles can be embodied within a variety of somewhat differently appearing and differently constructed structures with a minimum of difficulty through the use or exercise of routine engineering skill. Thus, for example, while the structures shown are especially adapted for use as doghouses it is considered that anyone skilled in building playhouses should be able to easily adapt such structures for use as playhouses by appropriate, minor modifications.

DETAILED DESCRIPTION

In the drawing there is shown a foldable structure — a doghouse — 10 in accordance with this invention which includes parallel side walls 12 and 14. These side walls 12 and 14 are connected by hinges 16 to top members 18 and 20. The top members 18 and 20 are further connected along adjacent edges 22 by further hinges 24. It will be noted that the distance between the hinges 16 and the hinges 24 is greater than the distance between the side walls 12 and 14 when the structure 10 is in an expanded configuration as shown in the initial two figures of the drawing.

This enables the top members 18 and 20 to be located so as to appear as a normal sloping roof (not separately numbered). In order to complete this roof (not separately numbered) an angle iron shaped piece of roof flashing 26 is attached to the top member 18 so as to extend across the edges 22 and generally along the top member 20 when the structure 10 is in an expanded configuration. The dimensions of the flashing 26 are such that this flashing 26 preferably fits closely adjacent to the top member 20 when the structure 10 is expanded so as to shield the edges 22 from ambient influences such as rain.

Preferably the flashing 26 is somewhat resilient in character so as to tend to act as a spring and fits sufficiently closely to the top member 20 so as to serve a locking or holding function, tending to prevent folding of the structure 10. With this preferred construction as the structure 10 is being folded either into or out of the expanded configuration shown in FIGS. 1 and 2 the flashing 26 will be deformed slightly so as to accommodate relative movement between the edge 22 of the member 20 and the edge 22 of the member 18. With this preferred construction this flashing 26 will fit against the member 20 in much the manner of a detent or toggle type spring so as to tend to impede undesired or inadvertent folding of the structure 10 from its expanded configuration.

In the structure 10 two end walls 28 shaped as upwardly extending trapezoids of a bilaterally symmetrical character are used to connect the two side walls 12 and 14 adjacent to one end (not separately numbered) of the structure 10 while two bilaterally symmetrical end walls 30 of corresponding external shape are used to connect the side walls 12 and 14 adjacent to the other of the ends (not separately numbered) of the structure 10. In the preferred construction of the structure 10 these end walls 28 and 30 are dimensioned so as to fit closely up against the top members 18 and 20 when the structure 10 is in an expanded configuration as shown in FIGS. 1 and 2 in order to effectively seal the interior of the structure 10 against ambient conditions such as rain.

Further, the end walls 28 and 30 are preferably inset from the extremities (not separately numbered) of hinges 32 in connecting the end walls 28 and 30 to the side walls 12 and 14. The adjacent edges 34 of the end walls 28 and 30 when the structure 10 is in its expanded configuration are connected by further hinges 36. It will be noted that these hinges 32 and 36 are all disposed so as to have parallel axes (not shown) and that the edges 34 are midway between the side walls 12 and 14 when the structure 10 is in its expanded configuration.

In order to provide for animal access the end walls 30 are provided with conventional gravity closing doors 38 capable of being opened by an animal in order to gain access either into or out of the structure 10. These doors 38 are suspended by pivot rods 40 of a known type mounted on the end walls 30.

A bottom 42 is also utilized to extend between the side walls 12 and 14. The bottom 42 is dimensioned so as to enclose the space between the walls 12 and 14 and the walls 28 and 30 when the structure 10 is expanded as shown in FIGS. 1 and 2. This bottom 42 is connected to the wide wall 12 by means of hinges 44. It is further connected by an offset hinge 46 to a link 48. This link 48 is attached by a further hinge 50 to the side wall 14 so as to be immediately beneath the bottom 42 when the structure 10 is in the expanded configuration as illustrated in FIGS. 1 and 2.

These hinges 44, 46 and 50 all have parallel axes (not shown) and are arranged in such a manner that the bottom 42 may be pivoted upwardly about the hinges 44 as the structure 10 is folded. Such movement of the bottom 42 is, of course, transmitted through the hinge 46 to the link 48 so as to cause this link 48 to pivot relative to the side wall 14 about the hinge 50. When the structure 10 is being unfolded from an expanded configuration the bottom 42 will abut against the link 48 as shown in FIG. 2 in such a manner that the link 48 serves as a stop for the bottom 42 and serves to support the bottom 42 against sagging such as might be caused by a heavy animal being located on the bottom 42.

It is to be noted that the hinges 46 and 50 are offset slightly and to different extends relative to an imaginary line (not shown) extending perpendicular between the side walls 12 and 14 from the axis of rotation of the hinges 44. This structure is considered desirable in providing a sort of toggle type action in connection with the action of the hinges 32 and 36 connecting the end walls 28 and 30 to the side walls 12 and 14 and to one another. From an examination of FIG. 3 it will be apparent that the hinges 36 connecting the edges 34 are located along one side or surface (not separately numbered) of the end walls 28 and 30 when these walls 28 and 30 are in alignment as the structure 10 is in the expanded configuration while the other hinges 32 are on the other surface (not separately numbered) of these end walls 28 and 30.

With the described structure 10 because of the distances between the various hinges enumerated and the locations of these hinges on opposite sides of the end walls 28 and 30 and because of the orientations of these hinges relative to the link 48 and the bottom wall 42 a type of over-center toggle like action is obtained. With the described structure this action serves to hold the end walls 28 and 30 in place when the bottom wall 42 is in an orientation as shown in FIG. 2. Because of this toggle action it is not considered that it is normally necessary to utilize any sort of latch means to secure the end walls 28 and 30 against inadvertent movement, even when because of loose hinge pins there is a certain amount of looseness in the composite linkage employed in the structure 10. As pointed out in the preceding the flashing 26 is used as a latch member (not separately numbered) so as to tend to prevent undesired folding.

It is believed that it will be apparent from the preceding that the structure 10 may be folded from its expanded configuration as shown in FIGS. 1 and 2 to its folded configuration by being tilted so as to gain access to the bottom 42 and then by pushing on the bottom 42 so as to tend to pivot it upwardly. As this occurs the top members 18 and 20 will tend to pivot upwardly away from the end walls 28 and 30. Concurrently these end walls 28 and 30 will pivot so as to extend outwardly from the side walls 12 and 14 while the bottom 42 will pivot so as to be directed upwardly generally between the top members 18 and 20. The structure 10 may be unfolded for a configuration as shown in FIG. 4 by merely moving the side walls 12 and 14 away from one another.

It will, of course, be apparent that the relationship between the hinges used is quite important in obtaining this method of folding. The hinges 16, 32, 44, and 50 can be considered as a first group of hinges used to connect the various parts described to the side walls 12 and 14 so as to permit the folding action indicated while the hinges 24, 36, and 46 may be considered as a second group of hinges used to obtain the folding action indicated. All of these hinges of the second group have their axes in a common plane (not shown) while all of the hinges of the first group have their axes in either of two common parallel planes (not shown). In effect the structure 10 utilizes a roof (not separately numbered) including the top members 18 and 20 forming a set of parts, ends including end walls 28 and 30 forming a set of parts, and a bottom structure consisting of a bottom 42 and a link 48 forming a set of parts. The parts in these sets are all located adjacent to one another so that each set extends between the side walls 12 and 14.

In FIG. 5 there is shown a modified structure 100 which is quite similar to the structure 10. In the interest of brevity those parts of the structure 100 which are identical or substantially identical to the various parts of the structure 10 are not separately described herein and are indicated in the remainder of this specification and in the drawing by the numerals previously used to describe such parts preceded by the numeral "1".

The structure 100 differs from the structure 10 by employing two identically dimensioned bottom walls 152 joined by hinges 154 approximately corresponding to the previously described hinges 46. One of these bottom walls 152 is joined to the side walls 112 by further hinges 156 corresponding to the hinges 44. The other of the bottom walls 152 is connected to the side wall 114 by means of further hinges 158 corresponding to the previously described hinge 50. A small overlapping "latch" or abutting member 160 is located as shown on one of the bottom walls 152 in order to engage the other bottom wall 152 in order to limit relative movement between the bottom walls 152 so as to minimize the possibility of sagging of these bottom walls 152 when the structure 10 is in an expanded configuration.

In FIGS. 6 and 7 there is shown a further modified structure 200 which is also quite similar to the structure 10. In the interest of brevity those parts of the structure 200 which are identical or substantially identical to various parts of the structure 10 are not separately described herein and are indicated in the remainder of this specification and in the drawing by the numerals previously used to designate such parts preceded by the numeral "2".

In the structure 200 two identical links 262 are attached together in end to end relationship by a hinge 264 and are connected at their extremities (not separately numbered) remote from one another to the side walls 212 and 214 by other hinges 266. These links 262 are utilized to support bottom walls 268 of identical dimensions secured to one another and to side walls 212 and 214 by hinges 270 and 272. These walls 268 correspond to the walls 152, the hinges 270 correspond to the hinges 154, and the hinges 272 correspond to the hinges 156 and 158.

Preferably the links 262 extend in alignment with one another and the combined lengths of the links 262 should be slightly greater than the distance between the side walls 212 and 214 when the structure 200 is expanded in order to obtain a slight toggle action tending to hold or spread these walls 212 and 214 apart. Thus, they serve as a locking type means to hold the structure 200 against undesired folding. By abutting against the walls 268 they also prevent sagging of these walls 268.

We claim:

1. A structure having spaced, parallel side walls, a bottom extending between said side walls, a top extending between said side walls, and parallel ends extending between said side walls in which the improvement comprises:
    said top, said bottom, and each of said ends each including a set of two parts, the parts of said sets being located adjacent to one another so that each set extends between said side walls,
    a first group of hinge means, each hinge means of said first group pivotally connecting a single part of each of said sets to one of said side walls, a second group of hinge means each hinge of said second group pivotally connecting the parts of each set midway between said side walls,
    all of said hinge means of both groups which are secured to said top and said bottom having parallel axes,
    said hinge means in said first and second groups permitting said structure to be folded between an expanded configuration in which said side walls are spaced from one another and a folded configuration in which said side walls are adjacent to one another,
    said hinge means of said first and said second groups are located so as to permit said parts of said bottom to pivot upwardly between said sides when said structure is in said folded configuration and so as to permit said ends and said top to pivot outwardly from between said sides when said structure is in said folded configuration.

2. A structure as claimed in claim 1 in which:
    said hinge means of said first and second groups on said ends and said bottom being on opposite surfaces of said ends and said bottom.

3. A structure as claimed in claim 1 wherein:
    in said expanded configuration said parts of said top are located at an angle to one another,
    said top includes a ridge flashing means secured to one of said parts and extending across the adjacent edges of said parts and along the other of said parts, said ridge flashing means being unattached to the other of said parts, said ridge flashing means being located on the side of said top remote from said bottom,
    said flashing means is resilient, said flashing means fits relatively to said other of said parts of said top so as to be temporarily deformed when said structure is folded from said expanded configuration to said folded configuration.

4. A structure as claimed in claim 1 wherein:

said bottom consists of a set of two parts of equal width extending between said side walls and including overlapping means secured to one of said parts and unattached to the other of said parts for engaging the other of said parts when said structure is in said expanded configuration so as to prevent said parts from being rotated generally downwardly between said side walls when in said expanded configuration.

5. A structure as claimed in claim 4 wherein:

said hinge means of said first and second groups on said ends and said bottom being on opposite surfaces of said ends and said bottom.

6. A structure as claimed in claim 1 wherein:

said bottom consists of a set of two parts of equal width extending between said side walls and including a set of links of equal length located end to end and extending between said side walls beneath said bottom, a pivot means connecting the adjacent ends to said links and other pivot means connecting the ends of said links remote from one another to said side walls, said bottom abutting at least one of said links when said structure is in said expanded configuration.

7. A structure as claimed in claim 6 wherein:

said hinge means of said first and second groups on said ends and said bottom being on opposite surfaces of said ends and said bottom.

8. A structure as claimed in claim 1 wherein:

said set of parts included within said bottom comprises a bottom wall extending between said side walls and a control link means for causing movement of said bottom wall during movement of said side walls together, said bottom wall being pivotally connected to one of said side walls by one of said hinge means in said first group, said link means being pivotally connected to the other of said side walls by another of said hinge means of said first group, said link means and said bottom wall being pivotally connected by one of said hinge means of said second group along one surface of said bottom wall.

9. A structure as claimed in claim 8 wherein:

said hinge means of said first and second groups on said ends and said bottoms being on opposite surfaces of said ends and said bottom.

* * * * *